United States Patent Office 2,740,116
Patented Mar. 27, 1956

2,740,116
METHOD OF PRODUCING PHOSPHORIC PRODUCTS

Leroy H. Facer, Phelps Township, Ontario County, N. Y., assignor, by mesne assignments, to Glen E. Cooley, Schenectady, N. Y., Warren Dunham Foster, Ridgewood, N. J., Halfdan Gregersen, New York, N. Y., Magnus I. Gregersen, Englewood, N. J., and Dana S. Lamb, New York, N. Y., trustees No Drawing. Original application July 9, 1942, Serial No. 450,324. Divided and this application April 19, 1951, Serial No. 221,932

17 Claims. (Cl. 71—37)

As is well known to practitioners of the fertilizer art, the three major products of importance in any complete or mixed fertilizer (known in the trade as "mixed goods") are nitrogen (N), phosphorus ($P_2O_5$), and potash ($K_2O$). Few of these products are separately sold to farmers but are combined into completely or partially mixed fertilizers, either by their manufacturers or by intermediary establishments known as a "dry mixers." The material most widely used as a source of phosphates, either in a mixed fertilizer or alone, is superphosphate. Superphosphate of usual concentration generally is made by treating ground phosphate rock with sulphuric or other strong mineral acid in order to convert the phosphate in the rock, which is in a form in which it cannot be used by the plant, to a form in which it can be so used.

Because of economic and other considerations superphosphate in a large majority of cases makes up more than one third and generally even more than one half of the total bulk and weight of any mixed fertilizer. In the concentration generally sold superphosphate does not exceed 18 percent of so-called "available phosphoric acid," which is the standard used. ("Available phosphoric acid is the difference between the total phosphoric acid and the product which is soluble in a standard solution of ammonium citrate"—Association of Official Agricultural Chemists quoted in "Dictionary of Fertilizer Materials and Terms," "The American Fertilizer," Philadelphia, Pennsylvania. It is calculated at $P_2O_5$.) Materials used to furnish the nitrogenous and potassic components of mixed fertilizers contain up to fifty percent or even more available N or $K_2O$, respectively. Since fertilizer is a bulk product which in comparison with many other products of the heavy chemical industries is of relatively low value per ton, freight makes up a relatively large proportion of the price that a farmer must pay and its phosphatic components contribute more than their proportionate share to this tax. As freight rates increase in the future phosphatic products of low concentration become increasingly uneconomic.

As a result of these factors various efforts have been made to produce phosphorus-bearing products which are more concentrated. Such efforts have been directed along two general lines known as heat processes and wet processes. Where electricity is available at a low cost or would otherwise go to waste or for other reasons is used on an uneconomic basis heat processes have found slight acceptance. This invention and those related thereto are not concerned with such generally uneconomic operations. Alternatively and to a presently much greater extent so-called "triple superphosphate," having a concentration of the order of fifty percent $P_2O_5$, is produced by a "wet" process under which phosphate rock is acidulated with phosphoric acid. Such conventional wet processes, although cheaper per unit than heat processes, so far as known to me still cost much more per unit of $P_2O_5$. In terms of units of $P_2O_5$ less than ten percent in this country is applied other than by superphosphate of regular concentration. Thus in spite of great saving of freight, high capital, operating and material costs have prevented wide adoption of concentrated superphosphates.

To reduce these costs I have developed a novel (wet) method of producing triple superphosphate, as is described and claimed in my companion application Serial Number 221,931 filed April 19, 1951, which like this application is a division of my co-pending application Serial Number 450,324, filed July 9, 1942. My improved triple superphosphate is much less expensive in plant and operation than any other triple superphosphate known to me and costs about the same per unit of $P_2O_5$ as do conventional superphosphates of ordinary concentration. Even so it is more expensive per unit than is my improved superphosphate of ordinary concentration as described and claimed in my co-pending application Serial Number 432,350, filed February 25, 1942, parent to my application Serial Number 450,324. One reason for this additional cost is the higher cost of phosphoric acid relatively to sulphuric in terms of resulting salable output. Superphosphates with a concentration of more than about 20 percent $P_2O_5$ can not be made except with phosphoric acid, if generally available phosphatic materials are used. For an explanation of conventional and my novel methods of producing triple superphosphate see my said companion application.

An important object of this invention, therefore, is provision of methods to produce phosphoric acid more cheaply, in capital and operating costs, than has heretofore been possible, so far as I am aware. Another closely related object is to produce a superphosphate of medium concentration, which for convenience herein only I call "enriched superphosphate," which meets a large part of the demand for a concentrated superphosphate but at a greatly reduced cost per unit. This second mentioned object is achieved through the application of certain of my discoveries which are closely related to those by which I produce phosphoric acid per se. Phosphoric acid made according to this invention is highly useful for my enriched superphosphate and triple superphosphate but is not limited to my (or any other) process of making triple or other superphosphate and can be employed for any purpose. As a step in the production of my enriched superphosphate I make phosphoric acid in situ and then utilize this acid, together with additional sulphuric, to produce a superphosphate of from 24 to 30 percent available phosphoric acid. As a result of the practice of these processes, whether applied to phosphoric acid or enriched super phosphate, I secure a by-product which for convenience I call "gypsum sludge," which is of great value in novel processes and products in the fertilizer art, as is another object of this invention.

An important object of my invention is to produce both my enriched superphosphate and gypsum sludge without the use of concentrated phosphoric acid and all at greatly decreased operating and capital costs. Plants to produce phosphoric acid and triple superphosphate require a relatively large capital investment and can be undertaken only upon the basis of a large operation. Plants to produce my phosphoric acid and enriched superphosphate may be inexpensive and relatively small and are within the reach of a relatively small operator.

In my co-pending parent application, Serial Number 450,324, filed July 9, 1942, I describe and claim other processes all depending upon processing a phosphatic or related component or one containing a metallic (minor) element either by a direct use of materials which conventionally are either wasted or must be expensively reprocessed for effective use, or by the use of such materials in a manner to produce at one operation both a major product and a minor but important by-product. As in my parent application this invention is particularly concerned with the maximum utilization of a strong mineral acid or acids in a manner which saves time, cost and materials. Also as in my parent application and herein I consolidate what previously has been a series of separate manufacturing operations into one. Thus it is conventional in this art to complete the manufacture of phosphoric acid as one isolated operation, then transport the finished acid to a distant point and utilize it to make a more concentrated superphosphate, likewise as a separate and isolated operation. As described herein in connection with enriched superphosphate I accomplish a better result more cheaply by telescoping separate operations into one continuous process in one place. By the use of the principles of this invention, I avoid processes which are expensive in capital, materials, labor and other operating costs and in respect of my enriched superphosphate secure a product which is physically and chemically better than conventional.

After describing my novel methods of producing enriched superphosphate I shall present my related processes for making phosphoric acid as a separate article of commerce. Prior discussion of my enriched superphosphate will assist in an understanding of the related processes by which I produce phosphoric acid.

My enriched superphosphate contains between 24 and 30 percent available $P_2O_5$, depending upon the materials which are used. Triple superphosphate is not sold to the farmer as such except in relatively limited quantities but is manufactured by a very few large producers who sell it to manufacturers of superphosphate or dry mixers who combine it with other materials to make so-called "high analysis" fertilizers. With very few exceptions fertilizers of these analyses can be made from my enriched superphosphate. Triple superphosphate as sold to the manufacturer of mixed fertilizers ordinarily costs at least 50 percent more per unit of available $P_2O_5$ than does superphosphate of ordinary strength. The cost of my enriched superphosphate per unit of available $P_2O_5$ ready for sale to the farmer is little if any greater than that of ordinary superphosphate, although it may slightly exceed the cost of superphosphate manufactured in accordance with the economical processes described and claimed in my co-pending application Serial Number 432,350, filed February 25, 1942, parent to the parent hereof. This enriched superphosphate has the peculiar crop-producing capacity of the product of my said application Serial Number 432,350. While those producers who now use triple superphosphate bought from others to reinforce their own production of superphosphate of 20 percent and less can not afford the capital and operating costs of a conventional plant making triple superphosphate for their use they can afford a plant for my enriched superphosphate.

Dilute phosphoric acid is the basis of my enriched superphosphate, but I employ a novel process requiring much less apparatus and expense than the conventional, creating thereby a by-product for which I have profitable use. I then use this phosphoric acid in combination with sulphuric acid in a conventional manner, in accordance with the teachings of the said parent of my parent application, in order to acidulate phosphate rock to produce superphosphate having as its available $P_2O_5$ the sum of that which I use as an acidulating agent and that which is rendered available by the process of acidulation of the phosphate rock.

I may acidulate phosphate rock with sulphuric acid in a normal manner to produce dilute phosphoric acid, or I may produce phosphoric acid in a novel manner described later herein. Ordinarily a mixture of this rock and sulphuric acid is passed through three reacting chambers and then into a settling chamber from which phosphoric acid of approximately 30° Baumé is drained, the residue being a sludge of phosphoric acid and gypsum. According to the conventional process this sludge is washed, generally by a counter-current method, in a series of chambers often as many as seven in number, and the final wash water used as a diluent for sulphuric acid which is employed to digest the rock to make the phosphoric acid. It will of course be understood that in the creation of phosphoric acid by the acidulation of phosphate rock sufficient acid must be provided to complete the conversion of the phosphorus of the rock to phosphoric acid and sufficient sulphate provided to combine with the calcium liberated from the phosphorus to produce calcium sulphate. Sulphuric acid accomplishes both these results. The purpose, therefore, of using this dilute phosphoric acid as a diluent is for convenience in adding to the total phosphoric acid that which is recovered from the gypsum and to make the mixture sufficiently fluid to facilitate the separation of the acid from the gypsum. Also, one quantity of water both washes one batch and dilutes the next. The percentage of $P_2O_5$ originally in the rock which remains after washing may exceed even 5 percent out of the original total of 33 percent (in a rock of 72 percent B. P. L.), or a loss of about 15 percent of the possible recovery.

In my process I may carry the washing only far enough to produce the minimum liquid necessary for the dilution of the mass to the point necessary for the separation of the phosphorus and the gypsum. It will be understood, however, that if desired I may proceed in the conventional manner. As a consequence if the washing is limited the gypsum sludge which remains after washing carries a relatively high percentage of phosphoric acid. As described in my said co-pending parent application and in my co-pending application Serial Number 222,536, filed April 23, 1951, I use this sludge in various advantageous and novel ways. It is of course to be understood that this production of a superphosphate by the use of a gypsum-phosphoric acid sludge need not be carried out jointly with the production of my enriched superphosphate, although the production of certain of the materials for each may well be carried out together. After concluding the description of my novel enriched superphosphate I shall present my processes for making phosphoric acid per se, these processes being modifications of those just described.

At this point I have phosphoric acid of 30° Baumé or 41 percent. For this process, I completely omit the usual and expensive step of concentrating this acid.

As well known in this art, concentrated phosphoric acid is difficult to transfer, handle and store. I avoid such difficulties by the use of a dilute acid. I use this acid as a diluent for strong sulphuric acid with which I acidulate phosphate rock in order to produce my enriched superphosphate. The ratio diluent to sulphuric acid is determined by the analysis of product which I wish to produce. By using phosphoric acid of 30° Baumé as a diluent of sulphuric acid of from 60° to 66° Baumé I am able to produce enriched superphosphate of from 24 to 30 percent available $P_2O_5$. Analyses of enriched superphosphate of less than 24 percent can be secured by the dilution of the sulphuric acid in part by water and in part by the phosphoric acid. The following examples are typical:

To produce one ton of my enriched superphosphate of 30 percent $P_2O_5$ I may mix 955 pounds of ground phosphate rock of 75 percent bone phosphate of lime, 440 pounds of 66° Baumé $H_2SO_4$ and 676 pounds of 30° Baumé $H_3PO_4$. Thereafter in the manner taught in my said co-pending parent applications I place the above mixture hot and steaming in a pelleting drum and coat with a hundred pounds of additional ground phosphate rock similar to that originally used. If desired, the entire amount of phosphate rock may be added at one time, but I secure a product which is both physically and chemically more desirable if I add it in the pelleting drum. By adjusting the pitch of the drum and the amount of moisture in the product and the duration of rotation I can make "pellets" of any desired size from merely large grains upwardly. It is emphasized that the term "pellets" therefore is to be understood to include such large grains, which need not be round. It is of course understood that no heat or other form of dehydration is to be applied to the drum and that this pelleting process is very rapid.

To produce one ton of enriched superphosphate of 24 percent available phosphoric acid, I may mix 1200 pounds of phosphate rock of 72 percent bone phosphate of lime, preferably 1100 pounds in the mixing pan and 100 pounds thereafter, 680 pounds of sulphuric acid of 60° Baumé and 285 pounds of phosphoric acid of 30° Baumé, proceeding as above.

As taught in the said parent of my parent application, I may add nitrogen and potash to the mixing pan or I may add these substances to the pelleting drum.

In order to enjoy the complete crop-producing advantages of my processes of producing superphosphatic fertilizers as described and claimed in my co-pending parent applications Serial Number 450,324 and 432,350, it is necessary that my products after they have solidified after the mixing operation, as for example in a den or block or along a screw conveyor, be not heated or dehydrated and that the water necessary for crystallization be maintained available for the chemical reactions which are peculiar to my product in its finished form. All forms of dehydration including vacuum drying as by an autoclave or otherwise and even conventional aeration as by repeated crane movements as well as actual heating—or negatively stated the absence of substantially consistent and reasonably rapid cooling—tend to be destructive of the chemical advantages of my product. For a full discussion of this phase of the preferred practice of this invention reference is made to my last previously mentioned co-pending application.

I have found the use of the above principles valuable in one of my novel methods of producing ordinary superphosphate by use of coarsely ground phosphate rock in a two-stage operation. A full description of claims thereto will be found in my co-pending parent application Serial Number 265,921, filed January 10, 1952.

Alternatively in this and other examples presented throughout this application I may cause the mass to solidify in any desired and practicable manner, for example and as taught in my said co-pending applications Serial Number 432,350 and 450,324. After solidification I remove the mixture from the den or the like and place it in a pelleting drum as described and claimed in said last above mentioned application. Thereupon while the drum is revolving I add the remaining one hundred pounds of rock as a coating material during the latter stage of the pelleting. The result is a dry and free-flowing superphosphate of the characteristics described and claimed in my said co-pending application, Serial Number 432,350.

As previously stated herein I prefer to produce the phosphoric acid which I use for my enriched superphosphate in a novel and related manner. Such phosphoric acid so produced, I wish to emphasize, may be employed independently of any fertilizer operation described or claimed herein or in said companion co-pending applications. This phase of this invention makes use of a modification of the principles and processes above described.

One factor in the relatively high cost of making phosphoric acid from ground phosphate rock is that the rock must be ground very fine in order to secure maximum chemical activity within the short space of time which it is practical to devote to a mixing operation. In the making of phosphoric acid, the entire reaction must take place in the chambers. Since fine rock must be used, other practitioners are limited to sulphuric acid of a concentration of 56° Baumé or below since otherwise the material balls up thus sealing much of the material from contact with acid. I am able to secure maximum penetration and ease of handling by making use of a two stage process similar to that mentioned above.

I use phosphate rock ground to the coarsest degree common in the United States for the manufacture of superphosphate, namely sixty percent passing through a hundred mesh screen. Many manufacturers of superphosphate, however, in spite of the additional cost, grind their rock much more finely. I illustrate my invention by rock ground so that eighty percent passes through such a screen. I thereupon divide this rock on the basis of coarseness of grinding. If the rock is of usual characteristics the coarse component which remains on a hundred mesh screen will average about twenty percent of the total. I thereupon place this coarse rock in a first reacting chamber and add sulphuric acid of the maximum concentration which is available for use, say for example 60° Baumé. No diluent is added. This concentrated acid thoroughly wets these coarse particles and actively begins the digestive process but the whole mass is fluid and the rock particles so coarse that there is no tendency to ball. Mild agitation keeps the solid particles from settling to the bottom and hastens the digestion of these coarse particles by keeping their surfaces exposed to concentrated acid, as will be apparent to those skilled in this art. After five or ten minutes of agitation I add whatever diluent, either water or dilute phosphoric acid, is necessary to lower the concentration of the acid to approximately 54° Baumé. Thereupon I add the remaining fine phosphate rock, which is 80 percent of the total, and proceed in accordance with the usual method of making phosphoric acid. That is to say, the mass is passed through a plurality of reaction chambers wherein the wash-water is used as an added diluent, until $H_3PO_4$ of 30° Baumé is secured. In a very small operation, the digestion can be completed in one chamber. The gypsum sludge preferably is washed only to the point which is economic and practical, the sludge being employed as elsewhere stated. The resulting phosphoric acid is of approximately 30° Baumé without any concentration and is therefore immediately available for use in making the enriched superphosphate which I have described hereinabove.

The concentration of the acid so produced is substantially that resulting from the first washing operation in the conventional wet process as in the Dorr process, other processes at this point securing only about 20° Baumé. I may make full use of all the phosphoric content which remains in the gypsum sludge in available form by carrying the washing further, as is conventional in the art. The product of this additional washing is of course more dilute than that previously secured. If a more concentrated acid is desired I merely concentrate the product of my process with or without the more thorough washing. I emphasize that coarse grinding and use of a highly concentrated acid much reduces the cost of production irrespective of the elimination of this further washing. It is particularly to be noted that for the most part phosphoric acid is produced at a point which requires transportation of sulphuric acid or materials therefor (or phosphate rock) for a considerable distance. The transportation of concentrated sulphuric acid obviously is cheaper than transportation of a dilute sulphuric acid. As a practical matter even when dilute acid is employed it is usually the product of dilution on the spot of more concentrated acid.

As previously described a sludge of gypsum containing a quantity of phosphoric acid, say from two to four percent of the total, is a by-product of the conventional and also of my novel processes that produce phosphoric acid. As stated above in order to save expense I may stop the washing operation while considerably more than this two to four percent of this phosphoric acid remains in the sludge. No matter at what point I stop I have novel, important and profitable use for this gypsum sludge and all of its available phosphoric content, as is described and claimed in my companion co-pending application, Serial Number 222,536, filed April 23, 1951, likewise divisional from my parent application.

It will have been noted from the foregoing portion of this specification that in processes described and claimed herein, I preferably separate phosphate rock which forms the base material in my operations on the basis of particle size. I apply the entire amount of acid necessary for acidulation of the entire end product to such coarse particles and thereafter add the fine particles to the acidic liquid-containing mass thus secured thereby completing the digestion. I make similar use of these principles in my said copending companion application relating to the making of triple superphosphate Serial Number 221,931, filed April 19, 1951, and also to my companion application Serial Number 265,921, filed January 10, 1952, relating to superphosphatic products, both of said applications being like this division from my said parent application Serial Number 450,324.

Although I am presenting for purposes of illustration only certain preferred embodiments of my invention it will be readily understood that changes may be made therein within the spirit of my invention and the scope of my broader claims. The advantages of this invention will have been made clear from the above discussion and are reflected in the appended claims. These advantages include the production at a relatively low cost per unit of available phosphate of an enriched superphosphate made without the use of concentrated sulphuric acid which meets a large majority of the uses within the United States of a concentrated superphosphate and the production at a relatively low capital, operating and materials cost of phosphoric acid. Another advantage is the production as a by-product of a gypsum sludge of which I make novel use.

I claim:

1. A process of producing a superphosphatic fertilizer which comprises separating ground phosphate rock into two portions, one containing relatively coarsely ground particles and one containing relatively finely ground particles, mixing said coarsely ground particles with concentrated sulphuric acid, the ratio of all rock and acid being such that the unavailable phosphates of the rock will be converted into phosphoric acid, agitating the mixture sufficiently thoroughly to wet these coarse particles and to begin the digestive process, adding to the mass a diluent to lower the concentration of the acid, adding the remaining portion of finely ground phosphate rock, agitating this mixture, separating the liquid phosphoric acid from the gypsum sludge substantially as soon as such separation can take place, mixing concentrated sulphuric acid and this phosphoric acid, adding such acid to ground phosphate rock of an amount such that said acid will convert its unavailable phosphate to available forms, and mixing said last mentioned rock and acid thereby forming an enriched superphosphate.

2. A process of producing a pelleted superphosphatic fertilizer which comprises separating ground phosphate rock into two portions, one containing relatively coarsely ground particles and the other containing relatively finely ground particles, mixing said coarsely ground particles with concentrated sulphuric acid, the ratio of rock and acid being such that the unavailable phosphate of the rock will be converted into phosphoric acid, agitating the mixture sufficiently thoroughly to wet these coarse particles and to begin the digestive process, adding to the mass a diluent to lower the concentration of the acid, adding the remaining portion of finely ground phosphate rock, agitating this mixture, separating the liquid phosphoric acid so formed from the gypsum sludge substantially as soon as such separation can take place, mixing concentrated sulphuric acid and this phosphoric acid, mixing said combined acid with ground phosphate rock, and directly passing the mass so formed to a revolving drum wherein it is formed into pellets, and thereafter retaining in the cured product as water of crystallization substantially all of the moisture present at the beginning of the pelleting operation.

3. A process of producing a pelleted superphosphatic fertilizer which comprises separating ground phosphate rock into two portions, one containing relatively coarsely ground particles and the other containing relatively finely ground particles, mixing said coarsely ground particles with concentrated sulphuric acid, the ratio of rock and acid being such that the unavailable phosphate of the rock will be converted into phosphoric acid, agitating the mixture sufficiently thoroughly to wet these coarse particles and to begin the digestive process, adding to the mass a diluent to lower the concentration of the acid, adding the remaining portion of finely ground phosphate rock, agitating this mixture, separating the liquid phosphoric acid so formed from the gypsum sludge substantially as soon as such separation can take place, mixing concentrated sulphuric acid and this phosphoric acid, mixing said combined acid with ground phosphate rock, and forthwith rolling said material upon itself whereby it is formed into pellets, and thereafter retaining the cured product as water of crystallization substantially all of the moisture present at the beginning of the pelleting operation.

4. A process of producing a superphosphatic fertilizer which comprises separating ground phosphate rock into two portions, one containing relatively coarsely ground particles and one containing relatively finely ground particles, mixing said coarsely ground particles with concentrated sulphuric acid and agitating said mixture until the coarse particles are thoroughly wet and the digestive process is begun, the ratio of the rock and acid being such that the unavailable phosphate of the rock will be converted into phosphoric acid, thereafter adding sufficient diluent to lower the concentration of the acid to the order of 54° Baumé, adding the remaining portion of finely ground phosphate rock, agitating this mixture, separating the liquid phosphoric acid from the gypsum sludge when it is of the order of 30° Baumé, a liquid being added so to reduce the concentration and to make separation practicable, mixing phosphoric acid so formed and sufficient concentrated sulphuric acid to reduce the mixture of phosphoric and sulphuric acid to the order of at least 56° Baumé, and mixing ground phosphate rock with the mass so formed thereby transforming the unavailable phosphorus of the rock to available forms, thereby forming an enriched superphosphate without the use of phosphoric acid except that formed in the operation as above set out.

5. A process of producing a superphosphatic fertilizer which comprises separating ground phosphate rock into two portions, one containing relatively coarsely ground particles and one containing relatively finely ground particles, mixing said coarsely ground particles with concentrated sulphuric acid of the order of 60° Baumé and agitating said mixture until the coarse particles are thoroughly wet and the digestive process is begun, the ratio of the rock and acid being such that the unavailable phosphate of the rock will be converted into phosphoric acid, thereafter adding sufficient diluent to lower the concentration of the acid to the order of 54° Baumé, adding the remaining portion of finely ground phosphate rock, agitating this mixture, separating the liquid phosphoric acid from the gypsum sludge when it is of the order of 30° Baumé, a liquid being added so to reduce the concentration and to make separation practicable, mixing said phosphoric acid so formed and concentrated sulphuric acid of the order of at least 60° Baumé, and mixing ground phosphate rock with the mass so formed thereby transforming the unavailable phosphorus of the rock to available forms, thereby forming an enriched superphosphate without the use of phosphoric acid except that formed in the mixing operation as above set out.

6. A method of producing a pelleted superphosphatic fertilizer which comprises dividing ground phosphate rock into two portions, one portion comprising relatively fine particles of which an amount of the order of eighty percent will pass through a screen with 100 meshes to the inch and the other portion of relatively coarse particles which will not pass through such a screen, mixing said coarse particles with concentrated sulphuric acid of the order of 60° Baumé and agitating said mixture until the coarse particles are thoroughly wet and the digestive process is begun, the ratio of rock and acid being such that the unavailable phosphate of the rock will be converted to phosphoric acid, thereafter adding sufficient diluent to lower the concentration of the acid to the order of 54° Baumé and adding the fine particles which make up the remainder of said phosphate rock, separating the phosphoric acid so formed from the gypsum sludge when it is of a concentration of the order 30° Baumé, a liquid being added so to reduce the concentration and make separation practicable, mixing said phosphoric acid so formed and concentrated sulphuric acid of the order of at least 60° Baumé, mixing ground phosphate rock with the acid so formed thereby transforming the unavailable phosphorus of the rock to available forms, and directly passing the mass so formed to a revolving drum wherein it is formed into pellets.

7. A method of producing a pelleted superphosphatic fertilizer which comprises dividing ground phosphate rock into two portions, one portion comprising relatively fine particles of which an amount of the order of 80 percent will pass through a screen with 100 meshes to the square inch and the other portion of relatively coarse particles which will not pass through such a screen, mixing said coarse particles with concentrated sulphuric acid and agitating said mixture until the coarse particles are thoroughly wet and the digestive process is begun, the ratio of rock and acid being such that the unavailable phosphate of the rock will be converted to phosphoric acid, thereafter adding sufficient diluent to lower the concentration of the acid to the order of 54° Baumé and adding the fine particles which make up the remainder of said phosphate rock, separating the phosphoric acid so formed from the gypsum sludge when it is of a concentration of the order of 30° Baumé, a liquid being added so to reduce the concentration and make separation practicable, mixing said phosphoric acid so formed and sulphuric acid of sufficient concentration to produce a combination of phosphoric and sulphuric acid of at least 56° Baumé, mixing ground phosphate rock with the acid so formed thereby transforming the unavailable phosphorus of the rock to available forms, and directly passing the mass so formed to a revolving drum wherein it is formed into pellets.

8. A process of manufacturing a pelleted enriched superphosphatic fertilizer which comprises using dilute phosphoric acid to dilute concentrated sulphuric acid, dividing ground phosphate rock into a major and a minor portion, mixing said major portion of said phosphate rock and sufficient quantity of the said combined acid to convert to available form the unavailable phosphates of said entire quantity of rock, the relative quantity of rock in said major portion being such as to result in a plastic mass after the combined acid has been mixed therewith, immediately passing such over-acidulated plastic mass into a rotatable pelleting drum, and rotating said drum thereby forming embryo pellets, and in a late stage of the pelleting operation adding said minor portion of said rock to the drum as it is rotated so that said minor portion adheres to and coats the embryo pellets and utilizes their remaining acidic component to acidulate such rock coating so that the identity of the pellets is thereafter maintained thereby, said entire pelleting operation being conducted under conditions such that the heat of reaction is dissipated readily and with substantially no evaporation of the water originally present.

9. A process of manufacturing a pelleted enriched superphosphatic fertilizer which comprises using dilute phosphoric acid to dilute concentrated sulphuric acid, dividing ground phosphate rock into a major and a minor portion, mixing said major portion of said phosphate rock and sufficient quantity of the said combined acid to convert to available form the unavailable phosphates of said entire quantity of rock, the relative quantity of rock in said major portion being such as to result in a plastic mass after the combined acid has been mixed therewith, immediately rolling such over-acidulated plastic mass upon itself thereby forming embryo pellets and in a late stage of such pelleting operation adding said minor portion of said rock to the mass as it is rolled upon itself so that said minor portion adheres to and coats the embryo pellets and utilizes their remaining acidic component to acidulate such rock coating so that identity of the pellets is thereafter maintained thereby, said entire pelleting operation being conducted under conditions such that the heat of reaction is dissipated readily and with substantially no evaporation of the water originally present.

10. A process of manufacturing a pelleted superphosphate which comprises using phosphoric acid of a concentration of the order of 30° Baumé to dilute sulphuric acid, dividing phosphate rock into a major and minor portion, mixing the rock of said major portion and all of the acid so formed, the concentration and amount of this combined acid in relation to the phosphate rock of both portions being such that no more and no other water is present than that required in the acidulation reaction to produce superphosphate and to furnish substantially all of the water evaporated by the natural heat of reaction and all of the water of crystallization required for the substantially complete hydration of the end product, directly passing the mass so formed with the addition of said minor portion of phosphate rock to a revolving drum wherein it is formed into pellets, thereby combining the remaining free acid and the last added phosphate rock as superphosphate and converting the entire mass to a dry and non-coalescent condition thereby retaining in the cured product as water of crystallization substantially all of the original moisture which was actually present at the beginning of the pelleting operation.

11. A process of manufacturing phosphoric acid which comprises dividing ground phosphate rock into a minor portion consisting of particles which are relatively coarse and a major portion consisting of particles which are relatively fine, mixing said minor portion consisting of the coarse particles with sufficient relatively concentrated sulphuric acid to convert all of the unavailable phosphate of both portions to phosphoric acid, adding to the acidulated coarse rock sufficient diluent so that when the major portion consisting of the fine particles is added thereto there will be enough moisture to reach all particles thereof, adding said major portion, and after additional dilution separating the liquid acid so formed from the gypsum sludge.

12. A process of manufacturing particulate superphosphatic fertilizer which comprises: grinding a predetermined quantity of phosphate rock; dividing said ground rock into a major and a minor portion; mixing concentrated sulphuric acid and dilute phosphoric acid of desired concentrations to form a combined acid; mixing and reacting a predetermined quantity of said combined acid with said major portion of the said ground phosphate rock, the predetermined amount of combined acid being the amount sufficient to react with all of the said predetermined quantity of ground phosphate rock, and in excess of the amount sufficient to react with said major portion of said phosphate rock, and the concentration of the said combined acid being sufficiently high to limit and control the amount of water present to that required by complete reaction of the entire predetermined quantity of ground phosphate rock and the entire predetermined quantity of said combined acid and to furnish water of crystallization of the superphosphatic fertilizer produced after loss of water evaporated by the natural heat of reaction; disintegrating the mass formed by said mixing and reaction of said combined acid and said major portion of said rock to form disintegrated small particles which are chemically active and over-acidulated; subjecting said disintegrated small particles to movement to form coalesced larger particles of desired size; and thereafter adding the said minor portion of said ground phosphate rock to coat the said coalesced larger particles, thereby reacting said minor portion of the said ground rock with the said excess quantity of combined acid to form substantially dry, coalesced particulate superphosphatic fertilizer.

13. A process of manufacturing particulate superphosphatic fertilizer which comprises dividing a predetermined quantity of ground phosphate rock into a major and a minor portion; mixing concentrated sulphuric acid and dilute phosphoric acid of desired concentrations to form a combined acid; the concentration of the said combined acid being such as to supply not more than the amount of water required in the entire acidulation reaction, while furnishing the amount of water evaporated by the natural heat of reaction and the amount required to furnish substantially the full amount of water of crystallization for the completely hydrated yet dry final product; mixing said major portion of ground phosphate rock and the entire amount of said combined acid necessary to form a superphosphatic fertilizer from said entire predetermined quantity of ground phosphate rock, thereby producing an over-acidulated, moist, essentially solid mass which can be readily handled and which is disintegrable in the manner of ordinary superphosphate; disintegrating said mass into small particles; further processing the resulting small particles without the addition of external heat under conditions avoiding any substantial evaporation so as to obtain a dry final product, said further processing including adding to the outside surfaces of the disintegrated particles while still moist and overacidulated, the said minor portion of the ground phosphate rock, causing adherence of said added rock to said moist outside surfaces and a chemical bonding thereto, to produce a substantially dry, particulate superphosphatic fertilizer.

14. A process of manufacturing substantially dry, particulate superphosphatic fertilizer which comprises: dividing ground phosphate rock into a major portion and a minor portion; diluting sulphuric acid of a concentration on the order of from about 60° to about 66° Baumé with phosphoric acid of a concentration on the order of about 30° Baumé to form a combined acid, the concentration of the combined acid being such as to supply not more than the amount of water required in the entire acidulation reaction, while furnishing the amount of water evaporated by the natural heat of reaction and the amount required to furnish substantially the full amount of water of crystallization for the completely hydrated yet dry final product; mixing said major portion and the entire amount of said combined acid necessary to form a superphosphatic fertilizer from both said major and said minor portions of said phosphate rock, thereby producing an over-acidulated, moist, essentially solid mass which can be readily handled and which is disintegrable in the manner of ordinary superphosphate; disintegrating said mass into small particles; further processing the resulting small particles without the addition of external heat under conditions avoiding any substantial evaporation so as to obtain a dry final product, said further processing including adding to the outside surfaces of the disintegrated particles while still moist and over-acidulated, the said minor portion of the ground phosphate rock, thereby causing adherence of said added rock to said moist outside surfaces and a chemical bonding thereto, to produce substantially dry, particulate superphosphatic fertilizer.

15. A process of manufacturing phosphoric acid which comprises dividing ground phosphate rock into a minor portion consisting of particles which are relatively coarse and a major portion consisting of particles which are relatively fine, mixing said minor portion and sufficient relatively concentrated sulphuric acid to convert all of the unavailable phosphate of both portions to phosphoric acid, adding to the acidulated coarse rock sufficient aqueous diluent so that when the major portion consisting of the fine particles is added thereto there will be enough moisture to reach all particles thereof, adding said major portion of said rock and agitating said mixture, adding only sufficient additional aqueous diluent so that the liquid acid so formed may be separated from the gypsum sludge, and so separating said acid.

16. A process of manufacturing phosphoric acid which comprises dividing ground phosphate rock into a minor portion consisting of particles which are relatively coarse and a major portion consisting of particles which are relatively fine, mixing said minor portion and sufficient sulphuric acid of a concentration of the order of 56° Baumé or greater to convert all of the unavailable phosphate of both portions to phosphoric acid, adding to the acidulated coarse rock sufficient aqueous diluent so that when the major portion consisting of the fine particles is added thereto there will be enough moisture to reach all particles thereof, adding said major portion of said rock and agitating said mixture, adding only sufficient additional aqueous diluent so that the liquid acid so formed may be separated from the gypsum sludge, and so separating said acid.

17. A process of manufacturing phosphoric acid of a concentration of substantially 30° Baumé which comprises dividing ground phosphate rock into a minor portion consisting of particles which are relatively coarse and a major portion consisting of particles which are relatively fine, mixing said minor portion consisting of the coarse particles with sufficient sulphuric acid of a concentration of the order of 60° to 66° Baumé to convert all of the unavailable phosphate of both portions to phosphoric acid, adding to the acidulated coarse rock sufficient aqueous diluent so that when the major portion consisting of the fine particles is added thereto there will be enough moisture to reach all particles thereof, adding said major portion of said rock, agitating said mixture, adding only sufficient additional aqueous diluent so that the liquid acid so formed will be of a concentration of the order of 30° Baumé, and separating said acid from the gypsum sludge.

References Cited in the file of this patent

UNITED STATES PATENTS

| | | |
|---|---|---|
| 1,604,359 | Larison | Oct. 26, 1926 |
| 2,015,384 | Nordengren | Sept. 24, 1935 |
| 2,106,223 | Nordengren | Jan. 25, 1938 |
| 2,136,793 | Gabeler et al. | Nov. 15, 1938 |